United States Patent [19]

Kautetzky et al.

[11] 4,233,727
[45] Nov. 18, 1980

[54] ATTACHMENT FOR SCREW-TIGHTENING DEVICES, PREFERABLY FOR REACTOR PRESSURE VESSELS

[75] Inventors: Anton Kautetzky, Forchheim; Otto Müller, Effeltrich, both of Fed. Rep. of Germany

[73] Assignee: Kraftwerk Union Aktiengesellschaft, Mülheim, Fed. Rep. of Germany

[21] Appl. No.: 930,977

[22] Filed: Aug. 4, 1978

[30] Foreign Application Priority Data

Aug. 16, 1977 [DE] Fed. Rep. of Germany ....... 2736733

[51] Int. Cl.$^3$ .............................................. B25B 29/02
[52] U.S. Cl. ....................................... 29/560; 15/304; 81/57.38
[58] Field of Search .......................... 29/560; 81/57.38; 15/88, 104.05, 104.1 C, 304; 294/81 R

[56] References Cited

U.S. PATENT DOCUMENTS 3,877,326  4/1975  Kock et al. ...................... 81/57.38

*Primary Examiner*—Z. R. Bilinsky
*Attorney, Agent, or Firm*—Herbert L. Lerner

[57] ABSTRACT

Accessory for a screw-tightening device having a support ring with hydraulic piston-cylinder assemblies as tensioning elements for pressure-vessel cover screws, the assemblies being disposable on a flange of the pressure-vessel cover, fastening nuts for the cover screws being loosenable and tightenable as well as transportable by the screw-tightening device, including a divided auxiliary ring having parting gaps formed in a circumferential region thereof corresponding to a circumferential region of the support ring at which parting gaps are likewise formed, the auxiliary ring and the support ring being mutually superimposable and clampable, the divided auxiliary ring having the parts thereof provided with respective means for engagement by a lifting tool, the rings having flange connections at the parting gaps thereof, the flange connections being disconnectible to form at least two separate arcuate units respectively including part of the support ring and part of the auxiliary ring clamped together for transport by the screw-tightening device.

14 Claims, 8 Drawing Figures

ATTACHMENT FOR SCREW-TIGHTENING DEVICES, PREFERABLY FOR REACTOR PRESSURE VESSELS

The invention relates to an attachment or accessory for screw-tightening devices, preferably for reactor pressure vessels, wherein the screw-tightening device comprises a support ring with hydraulic piston-cylinder assemblies which can be placed on the cover flange of the pressure vessel as tensioning elements for the pressure vessel cover screws or bolts and wherein the fastening nuts of the cover screw are loosenable and fastenable as well as transportable.

Screw-tightening devices of the aforementioned general type, which especially operate hydraulically, have become known heretofore, for example, from U.S. Pat. No. 3,877,326. In reactor engineering, there is an increased requirement for safety. The individual hydraulic tensioning units are coupled only loosely to the support ring of the screw-tightening device during transport inside and outside the nuclear power plant, so that these must be secured additionally. The support ring per se is a relatively large component with respect to the dimensions of the reactor pressure-vessel cover; transporting the support ring is therefore difficult, especially if only narrow passageways like locks, sluices or the like are available.

It is therefore an object of the invention to provide an attachment or accessory for screw-tightening devices of the foregoing general type, by which the aforedescribed difficulties can be eliminated i.e. whereby the safety or reliability of transport is increased, and the transport of the screw-tightening device per se facilitated.

With the foregoing and other objects in view, there is provided, in accordance with the invention, an accessory for a screw-tightening device having a support ring with hydraulic piston-cylinder assemblies as tensioning elements for pressure-vessel cover screws, the assemblies being disposable on a flange of the pressure-vessel cover, fastening nuts for the cover screws being loosenable by the screw-tightening device, comprising a divided auxiliary ring having parting gaps formed in a circumferential region thereof corresponding to a circumferential region of the support ring at which parting gaps are likewise formed, the auxiliary ring and the support ring being mutually superimposable and clampable, the divided auxiliary ring having the parts thereof provided with respective means for engagement by a lifting tool, the rings having flange connections at the parting gaps thereof, the flange connections being disconnectible to form at least two separate arcuate units respectively including part of the support ring and part of the auxiliary ring clamped together for transport by said lifting tool.

The advantages attainable with the invention are primarily seen in the fact that the support ring and the auxiliary ring form a transport unit rigid in itself, even if they are divided into ring halves or also smaller circular arcuate ring sections. In this manner, transport through the material locks or sluices no longer poses a problem notwithstanding the small cross sections of the locks or sluices. Transport through the material locks or sluices is effected if several nuclear power blocks must be serviced with one screw-tightening device. With the auxiliary ring, the individual tensioning units can further be secured against falling or dropping, by means of only a few handles.

In accordance with another feature of the invention, the auxiliary ring is formed of two ring plates disposed in mutually spaced relationship as well as of support sleeves sandwiched therebetween and distributed about the circumference of the auxiliary ring, the number of support sleeves corresponding to the number of the cover screws or the hydraulic tensioning elements, and including tie rods fastened to one of the ring plates and extending through the support sleeves, the tie rods serving for performing at least one of the functions of coupling with the support ring coupling with the hydraulic tensioning elements of the support ring and engaging the lifting tool. Such an auxiliary ring is especially stiff or rigid against bending.

In accordance with a further feature of the invention, the two ring plates comprise a base plate and a cover plate, and receiving sleeves formed with an internal thread are secured to the base plate, the tie rods being threadedly securable in the internal thread.

In accordance with an added feature of the invention, the accessory includes nuts threadedly securable with damping washers on the free end of the tie rods for limiting the length of stroke of the pistons of the hydraulic piston-cylinder tensioning elements, when the tensioning elements are disposed with the support ring on the auxiliary ring and are subjected to an oil-wetting operation, the tie-rod nuts being turnable, after completion of the oil-wetting operation, for returning the pistons to starting position thereof.

In accordance with an additional feature of the invention, especially with the use of the auxiliary ring for mechanized cleaning of the fastening nuts, the accessory includes respective dust cups insertable into the support sleeves for receiving dust collected during cleaning of the fastening nuts, all of the fastening nuts, when loosened from the cover screws, being held by the support ring and being disposable on the auxiliary ring in coaxial relationship with the dust cups, respective sealing rings being interposed between the fastening nuts and the dust cups.

In accordance with yet another feature of the invention and for effecting safe discharge and removal of radioactive dust, a suction line is connected, respectively to the dust cups at the respective bottom thereof.

In accordance with yet a further feature of the invention, the accessory includes at least one device for cleaning the thread of the fastening nuts, the cleaning device being displaceably supported at the auxiliary ring.

In accordance with yet an added feature of the invention, the auxiliary ring is formed of a ring-shaped base plate and a ring-shaped cover plate disposed in mutually spaced relationship, the cleaning device includes a motor-driven metallic rotary brush, a jib arm is movably mounted at the inner periphery of the base plate and the cover plate, a cable pull is carried by the arm and holds the brush for raising and lowering the brush in axial direction of the fastening nuts.

In accordance with yet an additional feature of the invention, the accessory includes guide strips for the arm, the guide strips being secured to the inner periphery of the ring-shaped base and cover plates.

In accordance with another feature of the invention, the accessory includes a motor for driving the rotary brush, the motor being an air motor.

In accordance with a further feature of the invention, the accessory includes a motor for driving the rotary brush, the cable pull carrying the brush and the motor at one end thereof and carrying a counterweight at the other end thereof.

In accordance with an added feature of the invention, the accessory includes respective support bases adjustable in height and disposed at least at three uniformly spaced-apart locations on the circumference of the base plate, and an intermediate member securing the support bases, respectively, with spherical adjustment, to the receiving sleeves of the tie rods.

In accordance with an additional feature of the invention, the accessory includes centering sleeves for the fastening nuts, the centering sleeves being slidable, with the respective fastening nuts received therein, over the outer periphery of the sealing rings so that the fastening nuts are brought into a coaxial position enabling insertion thereof into receiving openings formed in the support ring, before the support ring and the auxiliary ring are mutually superimposed.

In accordance with a concomitant feature of the invention, the accessory includes a rotary brush for cleaning the fastening nuts, the dust cups having respective upper rims facing the respective sealing rings and extending upwardly beyond the inner periphery of the respective sealing ring so as to form a protective skirt for shielding the sealing ring from engagement by the rotary brush.

Other features which are considered as characteristic for the invention are set forth in the appended claims.

Although the invention is illustrated and described herein as embodied in attachment for screw-tightening devices, preferably for reactor pressure vessels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 2:
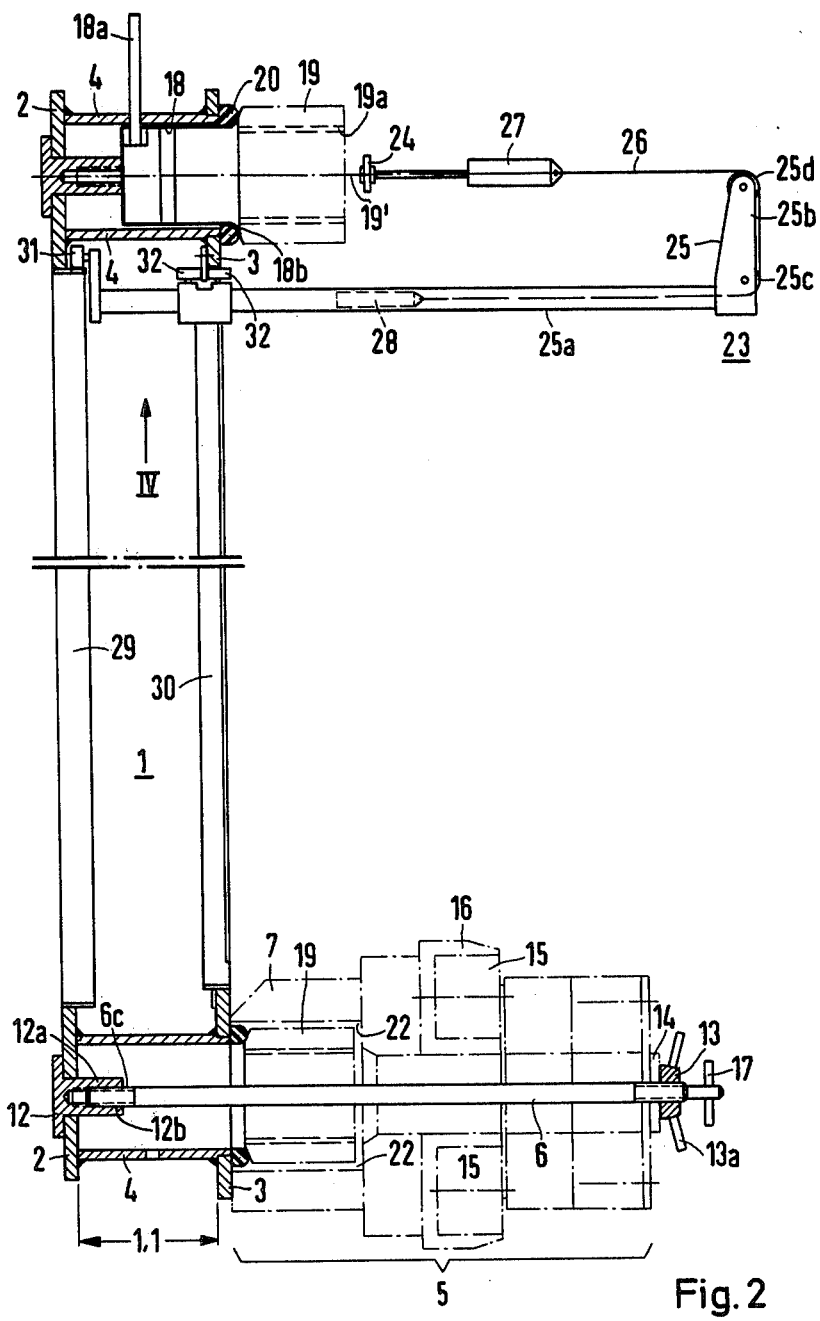
FIG. 2 is an enlarged side view of FIG. 1, shown partly in section.
Figure 4:
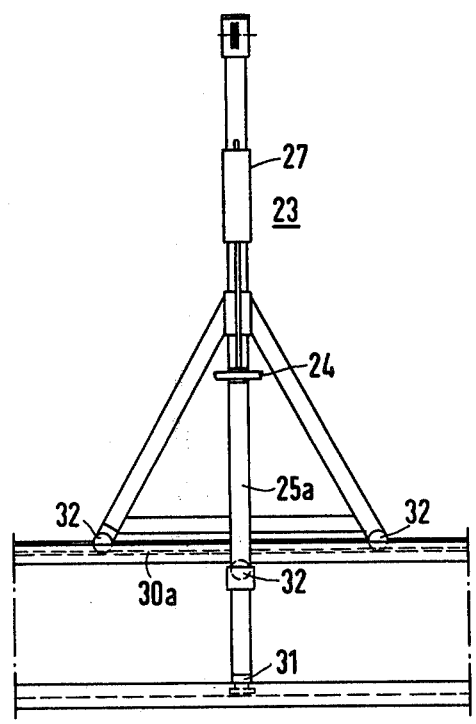
FIG. 4 is a side elevational view of FIG. 2 in direction of the arrow IV and showing a nut cleaning device.
Figure 5:
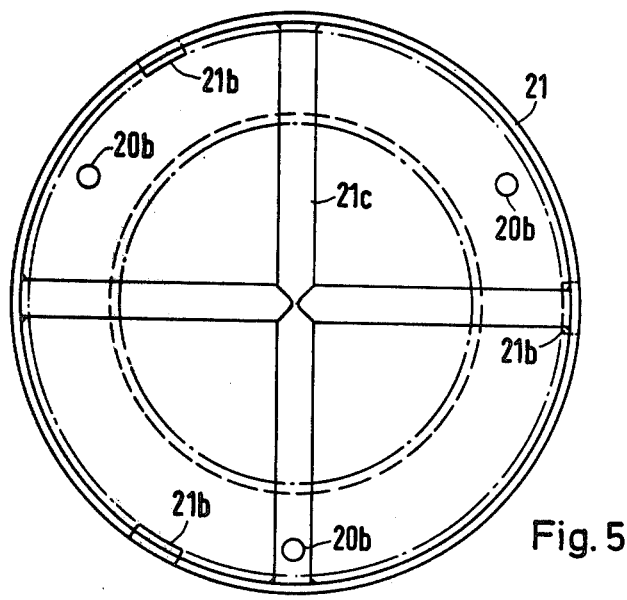
Figure 6:
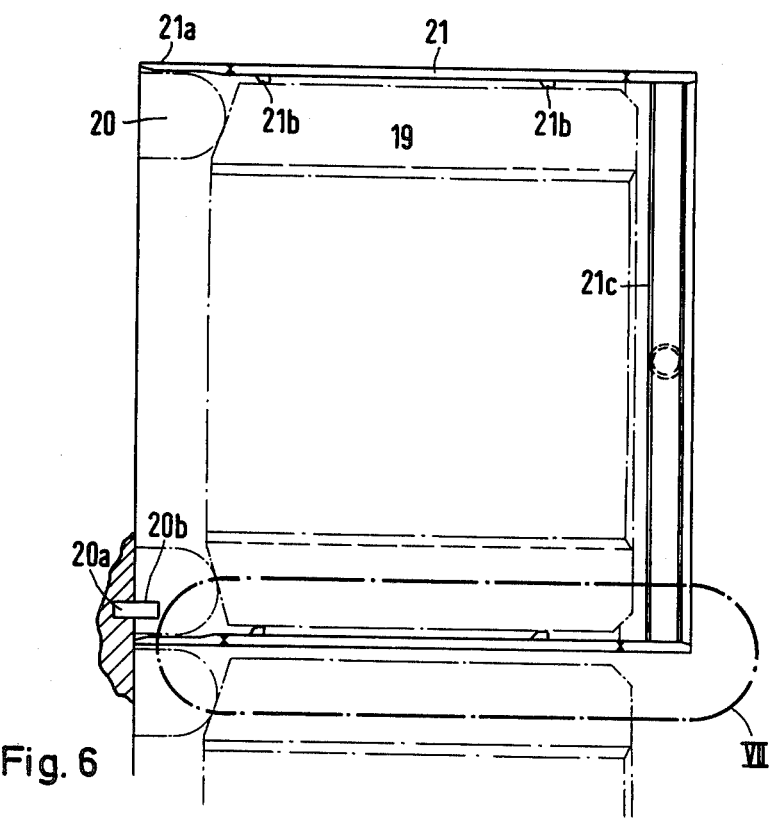
Figure 7:
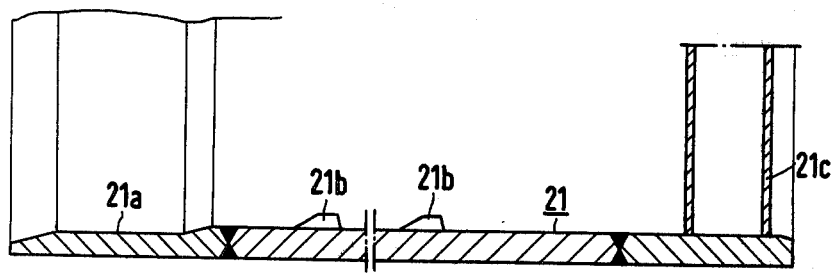
Figure 8:
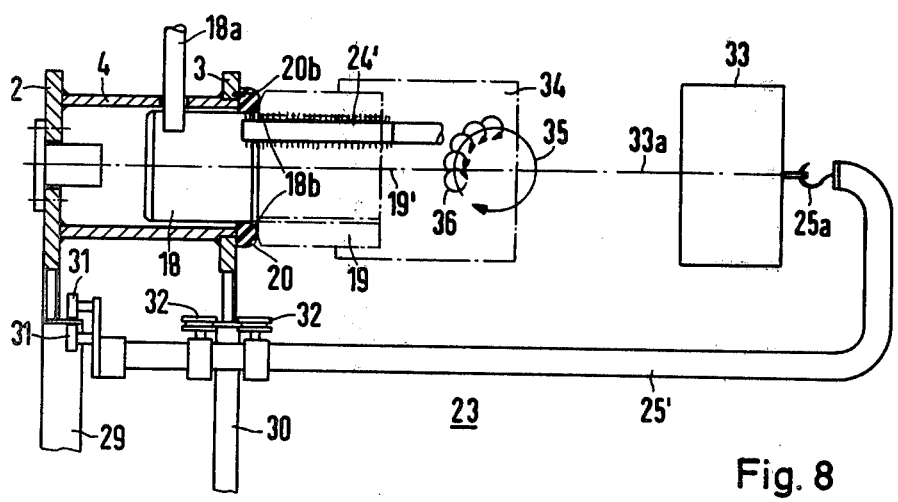

FIGS. 5 to 7 further show details of a centering sleeve for the fastening nuts; more specifically;

FIG. 5 is an enlarged top plan view of a centering sleeve for the fastening nuts;

FIG. 6 is a side elevational view of FIG. 5;

FIG. 7 is a fragmentary enlarged sectional view of FIG. 6 showing the detail thereof within the region bounded by the dot-dash line; and FIG. 8 is a view similar to that of FIG. 2 of the cleaning device of FIGS. 2 and 4.

Figure 1:
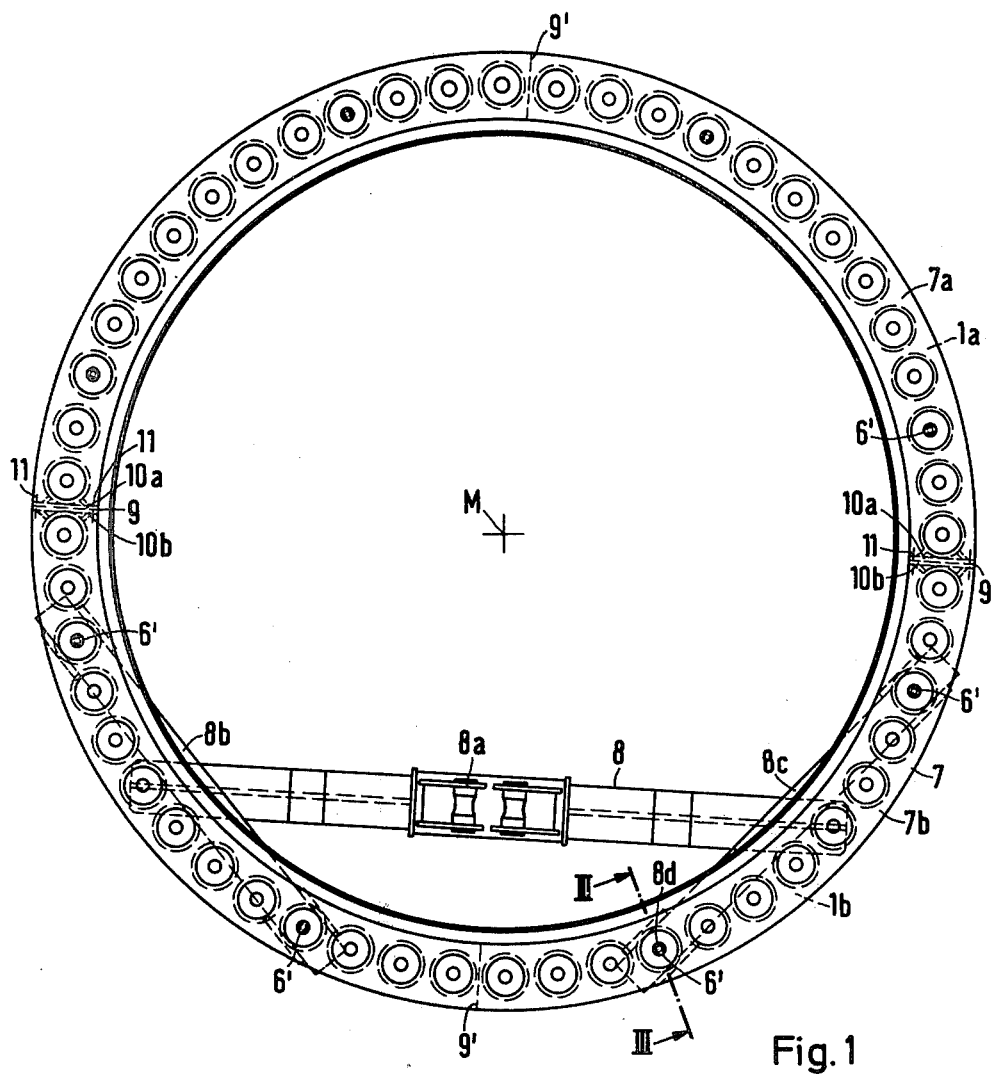
FIG. 1 is a plan view of an auxiliary ring according to the invention, clamped together with a support ring of an hydraulic screw-tightening device.
Figure 3:
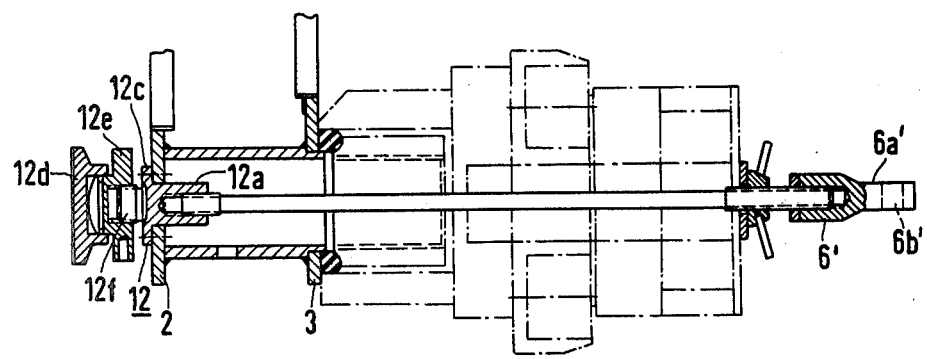
FIG. 3 is an enlarged cross-sectional view of FIG. 1 taken along the line III—III in direction of the arrows, a tie rod with a suspension point for a lifting crosspiece being shown.

Referring now to the drawing and first, particularly, to FIG. 2 thereof, there is shown an auxiliary ring 1 formed of two ring plates held at a distance 1.1 from each other and, in fact, of a base plate 2 and a cover plate 3. The auxiliary ring is further formed of support sleeves 4 which are disposed between the two ring plates 2 and 3 and are distributed over the circumference of the auxiliary ring 1 according to the number of the cover screws of the non-illustrated reactor pressure vessel-cover, or to the number of hydraulic tensioning elements 5. Tie rods 6, which serve for coupling to the support ring 7 or the hydraulic tensioning elements 5 thereof according to the presentation in FIG. 2, and which are fastened to the base plate 2, extend through the support sleeves 4. The tie rods 6 fulfill yet another purpose, however; Four tie rods 6' of each auxiliary ring half 1a, 1b, respectively, serve for engaging the transport crosspiece 8, as shown in FIG. 1, if the support ring half 7b and the respective auxiliary ring half 1b are to be transported in clamped-together condition; the ring halves 1a, 7a then being separated from the other ring halves 1b, 7b by opening or releasing the joint or parting-gap connection 9. Flanges 10a and 10b which lie on a diameter and are consequently radially oriented toward the center of the ring M can be clamped together by means of tangentially oriented, diagrammatically indicated flange bolts 11, otherwise not shown in detail. In FIG. 1, the support ring 7 is placed on the auxiliary ring 1 and, therefore, largely covers it. The auxiliary ring 1 has, besides the parting gaps aligned with the parting gap 9 of the support ring 7, additional parting gaps 9', which are rotated 90° relative to the parting gaps 9. The transport crosspiece has a support member 8a for engaging the lifting hook of a non-illustrated lifting device. Also provided are transverse spars 8b, 8c with slots 8d for extending therethrough extensions 6a' of extended tie rods 6', for serving as suspension points (FIG. 3). After the crosspiece 8 is set in place, the extensions 6a' are then locked to the crosspiece 8 by means of non-illustrated through-bolts, cotter pins or the like, which are stuck through the transverse bores 6b'. The crosspiece member 8a is disposed in the center of gravity of the transport device formed of the partial rings 1b/7b, which also applies accordingly to the other half 1a/7a. Depending upon the size of the support ring 7, a division into more than two support ring parts and corresponding auxiliary ring parts can be provided with a corresponding increase in the number of radially oriented joints or parting gaps 9. The support sleeves 4 are welded to the base plate 2 and the cover plate 3, respectively. Coaxially with the support sleeves 4, receiving sleeves 12 are sunk into the base plate 2 and have a neck 12a formed with an internal thread 12b, into which the tie rod 6 is screwed by the threaded end 6c thereof. The receiving sleeves 12 are bolted with the flange 12c thereof to the underside of the base plate 2; they are connected at least at three points of the circumference, evenly spaced from each other, to support bases 12d which are adjustable in height, the latter being screwed to the threaded end 12f of the receiving sleeves 12 through an intermediate member 12e with spherical adjustment (FIG. 3). Through these support bases 12d with spherical and height adjustment, the auxiliary ring 1 can be adjusted to the exact horizontal position before the support ring 7 is installed.

FIGS. 2 and 3 show that nuts 13 with elastic damping washers 14 are screwed onto the free, upper end of the tie rods 6. These nuts serve to limit the stroke for the hydraulic pistons 15 of the respective screw-tightening elements 5, if the latter, placed with the respective support ring 7 on the auxiliary ring 1, are subjected to an on wetting procedure. The nuts 13 with the damping washers 14 thereof further serve as return or restoring means for the pistons 15 if the latter are to be returned or restored to the illustrated starting position thereof after the wetting procedure is completed, the nuts 13 being turned, after the cylinder spaces 16 associated with the pistons 15 have been vented. A turning handle 17 for the tie rods 6 is further provided, by which the latter are screwed into the thread 12b; handling bars 13a for the nut 13 are also provided. The oil wetting procedure is performed in a manner that the complete screw-tightening device 7, 5 is deposited on the horizontally oriented auxiliary ring 1. Thereafter, the tie rods 6, 6' are screwed into the auxiliary ring 1. By adjusting the nut 13 with the elastic damping washer 14, the wetting stroke of the high-pressure pistons 15 is set. When hydraulic pressure of about 4 Mp (megapond) is applied to the tensioning units 5, the pistons 15 of the high-pressure cylinders 16 travel from the starting position thereof in accordance with the set stroke and wet the contact surfaces through this motion. The extended tensioning units 5 come to a soft stop against the damping washers 14. The pistons 15 of the high-pressure cylinders 16 are pushed back to the starting position thereof by the elastic damping washers 14 with the nuts 13.

As the upper half of FIG. 2 shows, dust cups 18 for collecting dust produced when cleaning the fastening nuts 19 are inserted into the support sleeves 4, the fastening nuts 19, unscrewed from the threaded studs of the reactor cover and held in the support ring 7, being disposable upon the auxiliary ring 1 coaxially with the dust cups 18, with the sealing washers 20 interposed. For even better centering of the fastening nuts 19, centering sleeves 21, slidable over the outer periphery of the sealing rings 20, according to FIGS. 5 to 7, are provided in a manner that the fastening nuts 19 can be brought into a coaxial position which enables them to be inserted into the support ring-receiving openings 22, before the support ring 7 is installed. These centering sleeves 21 are placed upon the sealing rings 20 when the dust cups 18 are mounted in the auxiliary ring 1, to make ready for the installation of the support ring 7. The sealing rings 20 per se are centered relative to the support sleeves 4 by means of centering pins 20a which are disposed in the flange 3, uniformly distributed over the circumference of the support-sleeve bore; in the embodiment illustrated in FIGS. 5 to 7, three centering pins 20a engage in corresponding bores 20b formed in the sealing rings 20. In detail, the centering sleeves 21 have a cylinder wall 21a, which is provided at the inner circumference thereof with centering projections 21b. For stabilizing the shape and for better handling, tubing in the form of a cross 21c is welded to one end of the centering sleeve 21. At the other end of the centering sleeve 21, the cylinder shell or casing 21a is tapered somewhat (end region 21a') to facilitate sliding onto the sealing rings 20.

At the dust cups 18, a respective suction line 18a is connected to the bottom thereof, the suction line 18a being unscrewable so that the duct cups 18 can be removed. A nut cleaning device, generally designated 23, is shown in the upper part of FIG. 2 and in FIG. 4. This nut cleaning device includes a motor-driven metallic rotary brush 24 which is held by a cable pull 26 supported in an arm 25 so that it can be raised and lowered in axial direction 19' of the nuts 19. In the illustrated embodiment of FIG. 2, an air motor 27 serves to drive the rotary brush 24. An electric motor can also be used instead. The advantage of an air motor is that a relatively strong air current can be directed toward the internal thread 19a, through which any dust particles present are blown into the dust cup 18, wherefrom they are then sucked away. The cable pull 26, at the end thereof, facing away from the brush 24, is provided with a counterweight 28 which is balanced against the weight of the brush 24 and the motor 27, so that only little force is required for handling the brush 24. As is shown in FIG. 2 and in the as yet to be described FIG. 8, the upper rim of the dust cups 18 facing toward the respective sealing ring 20 is drawn up above the inner periphery of the sealing ring 20 so high that a skirt 18b protecting the sealing ring 20 against the action of the rotary brush 24 is formed.

At the inner periphery of the base plate 2 and the cover plate 3, a respective ring-shaped guide strip 29, 30 is fastened, at which the arm 25 is supported by rolls 31, 32 so that a crossbeam thereof is movable in circumferential direction. The roll 31 serves for lateral guidance, while two rolls 32 engaging above and below a strip part 30a serve for taking over the weight and for lateral guidance. Also provided is a deflection bracket 25b with two deflection rolls 25c and 25d.

The threads of the nuts 19 are cleaned in a manner that all of the dust cups (fifty-two in number in the illustrated embodiment of the invention and corresponding to the number of cover bolts) are inserted into the auxiliary ring 1 with fifty-two sealing rings 20. All of the fastening nuts 19 are transported simultaneously in the support ring 7 of the screw-tightening device and deposited simultaneously on the auxiliary ring 1. The complete nut cleaning device 23 is installed at the auxiliary ring 1 on the inside thereof and, by manual operation, effortless cleaning of the nut threads 19a in an advantageous working position is possible. The activated dust that is produced is drawn off by suction downwardly through the line 18a.

In the cleaning device 23 according to FIG. 8, a lifting trolley 33 is suspended from the hook 25a of the arm 25' by a cable pull 33a, on which a cleaning machine generally designated 34, is suspended so that it can be raised and lowered. It includes a cleaning brush, diagrammatically indicated at 24', which can be set in rotation about the nut axis 19' according to the circular arrow 35 but can also rotate about its own axis according to the smaller circular motion arrows 36, so that a whirling motion results which is executed by the machine 34 automatically. Otherwise, the construction of the attachment or device according to the invention as embodied in FIG. 8, is as shown in FIG. 2 (like parts having the same reference characters).

There is claimed:
1. Accessory for a screw-tightening device having a support ring with hydraulic piston-cylinder assemblies as tensioning elements for pressure-vessel cover screws, the assemblies being disposable on a flange of the pressure-vessel cover, fastening nuts for the cover screws being loosenable and tightenable as well as transportable by the screw-tightening device, comprising a divided auxiliary ring having parting gaps formed in a circumferential region thereof corresponding to a circumferential region of the support ring at which parting gaps are likewise formed, said auxiliary ring and said support ring being mutually superimposable and clampable, said divided auxiliary ring having the parts thereof provided with respective means for engagement by a lifting tool, said rings having flange connections at said parting gaps thereof, said flange connections being disconnectible to form at least two separate arcuate units respectively including part of the support ring and part of said auxiliary ring clamped together for transport by said lifting tool.

2. Accessory according to claim 1 wherein said auxiliary ring is formed of two ring plates disposed in mutually spaced relationship as well as of support sleeves sandwiched therebetween and distributed about the circumference of said auxiliary ring, the number of support sleeves corresponding to the number of the cover screws and of the hydraulic tensioning elements, and including tie rods fastened to one of said ring plates and extending through said support sleeves, said tie rods serving for performing at least one of the functions of coupling with the support ring, coupling with the hydraulic tensioning elements of the support ring and engaging the lifting tool.

3. Accessory according to claim 2 wherein said two ring plates comprise a base plate and a cover plate, and receiving sleeves formed with an internal thread are secured to said base plate, said tie rods being threadedly securable in said internal thread.

4. Accessory according to claim 3 wherein said tie rods have free ends, and including pistons in said tensioning elements, nuts threadedly securable on the free end of said tie rods and damping washers slideable on the free end of said tie rods for limiting the length of stroke of the pistons of the hydraulic piston-cylinder tensioning elements, when said tensioning elements are disposed with the support ring on said auxiliary ring and said tensioning elements are subjected to an oil-lubricating operation, said tie-rod nuts being turnable, after completion of the oil-lubricating operation, for returning said pistons to starting position thereof.

5. Accessory according to claim 4 including respective dust cups insertable into said support sleeves for receiving dust collected during cleaning of the fastening nuts, all of the fastening nuts, when loosened from the cover screws, being held by said support ring and being disposable on said auxiliary ring in coaxial relationship with said dust cups, respective sealing rings being interposed between the fastening nuts and said dust cups.

6. Accessory according to claim 5 including suction lines connected, respectively, to said dust cups at the respective bottom thereof.

7. Accessory according to claim 1 including at least one device for cleaning the thread of the fastening nuts, said cleaning device being displaceably supported at said auxiliary ring.

8. Accessory according to claim 7 wherein said auxiliary ring is formed of a ring-shaped base plate and a ring-shaped cover plate disposed in mutually spaced relationships, said cleaning device including a motor-driven metallic rotary brush, a jib arm movably mounted at the inner periphery of said base plate and said cover plate, a cable pull carried by said arm and holding said brush for raising and lowering said brush in axial direction of the fastening nuts.

9. Accessory according to claim 8 including guide strips for said arm, said guide strips being secured to the inner periphery of said ring-shaped base and cover plates.

10. Accessory according to claim 8 including a motor for driving said rotary brush, said motor being an air motor.

11. Accessory according to claim 8 including a motor for driving said rotary brush, said cable pull carrying said brush and said motor at one end thereof and carrying a counterweight at the other end thereof.

12. Accessory according to claim 3 including respective support bases adjustable in height and disposed at least at three uniformly spaced-apart locations on the circumference of said base plate, and an intermediate member securing said support bases, respectively, with spherical adjustment, to said receiving sleeves of said tie rods.

13. Accessory according to claim 5 including centering sleeves for the fastening nuts, said centering sleeves being slidable, with the respective fastening nuts received therein, over the outer periphery of said sealing rings so that the fastening nuts are brought into a coaxial position enabling insertion thereof into receiving openings formed in the support ring, before the support ring and said auxiliary ring are mutually superimposed.

14. Accessory according to claim 5 including a rotary brush for cleaning the fastening nuts, said dust cups having respective upper rims facing the respective sealing rings and extending upwardly beyond the inner periphery of the respective sealing ring so as to form a protective skirt for shielding said sealing ring from engagement by said rotary brush.

* * * * *